US009420559B2

United States Patent
Bai et al.

(10) Patent No.: US 9,420,559 B2
(45) Date of Patent: Aug. 16, 2016

(54) OBSTACLE DETECTION AND WARNING SYSTEM USING A MOBILE DEVICE

(71) Applicant: International Business Machines Corporation, Armonk, NY (US)

(72) Inventors: Kun Bai, Elmsford, NY (US); Christian B. Kau, Los Altos, CA (US); Jerald T. Schoudt, Douglassville, PA (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/462,697

(22) Filed: Aug. 19, 2014

(65) Prior Publication Data

US 2016/0057726 A1    Feb. 25, 2016

(51) Int. Cl.
| | |
|---|---|
| *G08B 21/00* | (2006.01) |
| *H04W 64/00* | (2009.01) |
| *H04W 4/04* | (2009.01) |
| *H04W 4/02* | (2009.01) |
| *H04W 68/00* | (2009.01) |
| *G08B 21/02* | (2006.01) |

(52) U.S. Cl.
CPC ............... *H04W 64/00* (2013.01); *G08B 21/02* (2013.01); *H04W 4/027* (2013.01); *H04W 4/043* (2013.01); *H04W 68/00* (2013.01)

(58) Field of Classification Search
CPC .. G08B 21/0469; H04W 4/00; G06K 9/00805
USPC ............. 340/686.6, 521, 539.1, 573.1, 815.4, 340/384.1
See application file for complete search history.

(56) References Cited

U.S. PATENT DOCUMENTS

| | | | |
|---|---|---|---|
| 2008/0162133 A1 | 7/2008 | Couper et al. | |
| 2009/0237233 A1* | 9/2009 | Smith | G08B 6/00 340/539.1 |
| 2011/0210866 A1* | 9/2011 | David | G08G 1/166 340/903 |
| 2012/0062357 A1* | 3/2012 | Slamka | G01C 21/20 340/4.11 |
| 2014/0274205 A1* | 9/2014 | Goszyk | A61H 3/061 455/556.1 |
| 2014/0317914 A1* | 10/2014 | Shaker | A61N 1/3993 29/825 |

FOREIGN PATENT DOCUMENTS

WO    2012050337 A2    4/2012

OTHER PUBLICATIONS

Wang, "Collision-Free Optimal Motion Planning; An IP.com Prior Art Database Technical Disclosure," IP.com Electronic Publication, Jun. 5, 2012, IP.com No. IPCOM000218577D, 54 pages.
Wang, "Optimal Control of Robotic Manipulators with Obstacles Avoidance," An IP.com Prior Art Database Technical Disclosure, IP.com Electronic Publication, Jun. 7, 2012, IP.com No. IPCOM000218820D, 43 pages.
"Type n Walk," http://www.type-n-walk.com/, accessed on Aug. 14, 2013, pp. 1-3.
"Download: Road SMS App from Samsung Galaxy S," http://www.droid-life.com/2010/07/26/download-road-sms-app-from-samsung-galaxy-s/, accessed on Aug. 14, 2013, pp. 1-9.

(Continued)

*Primary Examiner* — Phung Nguyen
(74) *Attorney, Agent, or Firm* — Erik K. Johnson; Daniel E. Johnson (57) ABSTRACT

A method and system for detecting obstacles in a user's path by obtaining the user's location and direction of movement, as well as visual and audio inputs of the surrounding environment, and alarming the user if the method and system detect an obstacle approaching the user.

20 Claims, 4 Drawing Sheets

(56) References Cited

OTHER PUBLICATIONS

"iText 'n Walk," http://www.iphoneappsplus.com/social-networking/itext--n-walk/index.htm, accessed on Aug. 26, 2013, pp. 1-3.

"Walk N Text-Transparent Screen," https://play.google.com/store/apps/details?id=com.incorporateapps.walktext, accessed on Jul. 17, 2014, 2 pages.

"Type While Walking," http://itunes.apple.com/us/app/type-while-walking/id371920604?mt=8, Isayonline Services, accessed on Aug. 14, 2013, pp. 1-2.

Affolter, "Transparent Screen," https://play.google.com/store/apps/details?id=botweb.transparent.screen, Aug. 12, 2013, accessed on Aug. 14, 2013, pp. 1-4.

"Typewalk," https://play.google.com/store/apps/details?id=com.sigmacel.walkandtype (8) walk n shake n sms https://play.google.com/store/apps/details?id=com.walkNsms, SigmaCel Productivity, Oct. 17, 2011, accessed on Aug. 26, 2013, pp. 1-4.

Smith, "Android App News: WalkSafe stops you being run over," http://www.t3.com/news/android-app-news-walksafe-stops-you-being-run-over, Chris Smith, Nov. 28, 2011, accessed on Aug. 14, 2013, pp. 1-4.

Wang et al., "WalkSafe: A Pedestrian Safety App for Mobile Phone Users Who Walk and Talk While Crossing Roads" (abstract only), HotMobile, Feb. 28-29, 2012.

Benedetti, "Drive safely . . . with the help of your Android Smartphone," http://www.hometechmtl.com/2012/01/03/drive-safely-with-the-help-of-your-android-smartphone/, accessed on Aug. 15, 2013, pp. 1-7.

"Mobileye Research," http://www.mobileye.com/technology/mobileye-research/, accessed on Jul. 17, 2014, pp. 1-3.

Raphael et al., "Development of a Camera-Based Forward Collision Alert System," SAE International, Apr. 12, 2011, 12 pages.

Stein et al., "Challenges and Solutions for Bundling Multiple DAS Applications on a Single Hardware platform," MobileEye Vision Technologies Ltd., V.I.S.I.O.N. 2008, 8 pages.

Navon, "Session 2A : Design Platform SoC IP Qualification & Emulation Environment," IP based SoC Design Forum Proceedings 2004, Dec. 8-9, 2004, pp. 1-4.

Gat et al., "A Monocular Vision Advance Warning System for the Automotive Aftermarket," SAE World Congress & Exhibition 2005, Sep. 29, 2004, pp. 1-8.

Stein et al, A Computer Vision System on a Chip: a case study from the automotive domain, The First IEEE Workshop on Embedded Computer Vision, 2005, 5 pages.

Sole et al., "Solid or not solid: Vision for radar target validation," IEEE Intelligent Vehicles Symposium (IV2004), 6 pages.

Reisman et al., "Crowd detection in video sequences," IEEE Intelligent Vehicles Symposium (IV2004), 6 pages.

Dagan et al., "Forward Collision Warning with a Single Camera," IEEE Intelligent Vehicles Symposium (IV2004), 6 pages.

Shashua et al., "Pedestrian Detection for Driving Assistance Systems: Single-frame Classification and System Level Performance," IEEE Intelligent Vehicles Symposium (IV2004), 6 pages.

Stein et al., "Vision-based ACC with a Single Camera: Bounds on Range and Range Rate Accuracy," IEEE Intelligent Vehicles Symposium (IV2003), 6 pages.

Talukder et al., "Fast and Reliable Obstacle Detection and Segmentation for Cross-country Navigation," Intelligent Vehicle Symposium, IEEE , vol. 2, Jun. 2002, pp. 610- 618.

Ulrich et al., "Appearance-Based Obstacle Detection with Monocular Color Vision," Proceedings of the AAAI National Conference on Artificial Intelligence, Austin, TX Jul./Aug. 2000, 6 pages.

Storjohann, "Visual Obstacle Detection for Automatically Guided Vehicles," IEEE, 1990, pp. 761-766.

Bertozzi et al., "GOLD: A Parallel Real-Time Stereo Vision System for Generic Obstacle and Lane Detection," IEEE Transactions on Image Processing, vol. 7, No. 1, Jan. 1998, pp. 62-81.

Mell, "The NIST Definition of Cloud Computing," Version 15, Oct. 7, 2009, 2 pages.

Stein et al., "Stereo Assist: Top-down Stereo for Driver Assistance Systems," 8 pgs., 2010 IEEE Intelligent Vehicles Symposium, University of California, San Diego, CA, Jun. 21-24, 2010.

Stein et al., "A Robust Method for Computing Vehicle Ego-motion," 7 pgs., Proceedings of the IEEE Intelligent Vehicles Symposium 2000, Dearborn, Michigan, Oct. 3-5, 2000.

* cited by examiner

OBSTACLE DETECTION AND WARNING SYSTEM USING A MOBILE DEVICE

BACKGROUND

The present application relates generally to mobile device applications and more specifically to an obstacle detection system for a mobile device.

Mobile devices are a ubiquitous part of modern society. Over 90% of adults in the United States carry a mobile device, with that number climbing to 97% of adults under 50. Mobile devices allow people to have almost unlimited connectivity to the outside world through the internet, messaging services (e.g., e-mail, SMS and MMS), audio communication (e.g., telephone calls, and VOIP) or audio/visual communications (e.g., video conferencing). However, the convenience of mobile devices may also carry many distractions to a user, which may cause the user 104 to be hurt because of obstacles in their path.

BRIEF SUMMARY

An embodiment of the invention may include a method for detecting obstacles using a computing device. The method may include identifying information of an external surrounding environment in relation to the computing device. The method may also include determining geographic information of the computing device. The method may also include determining the presence of one or more obstacles based on the audio data, visual data and geographic information. The method may also include transmitting an alert based on the presence of the obstacle.

An additional embodiment of the invention may include a system for detecting obstacles with a computer having a processor, and a computer-readable storage device. The system also includes a program embodied on the storage device for execution by the processor. The program includes a plurality of program modules. An identifying module may be configured to identify environmental information, such as audio data or visual data, related to an external surrounding environment in relation to a computing device. A first determining module may be configured to determine geographic information of the computing device. A second determining module may be configured to determine whether one or more obstacles are present based on the audio data, the visual data, and the geographic information. An alerting module may be configured to transmit an alert based on determining one or more obstacles are present.

A computer program product for detecting obstacles, according to an aspect of the disclosed invention, includes a computer-readable storage medium having program code embodied therewith. The program code may be executable by a processor of a computer to perform a method. The computer program product may include identifying information of an external surrounding environment in relation to the computing device. The computer program product may also include determining geographic information of the computing device. The computer program product may also include determining the presence of one or more obstacles based on the audio data, visual data and geographic information. The computer program product may also include transmitting an alert based on the presence of the obstacle.

Further features as well as the structure and operation of various embodiments are described in detail below with reference to the accompanying drawings. In the drawings, like reference numbers indicate identical or functionally similar elements.

DETAILED DESCRIPTION

Figure 1A:
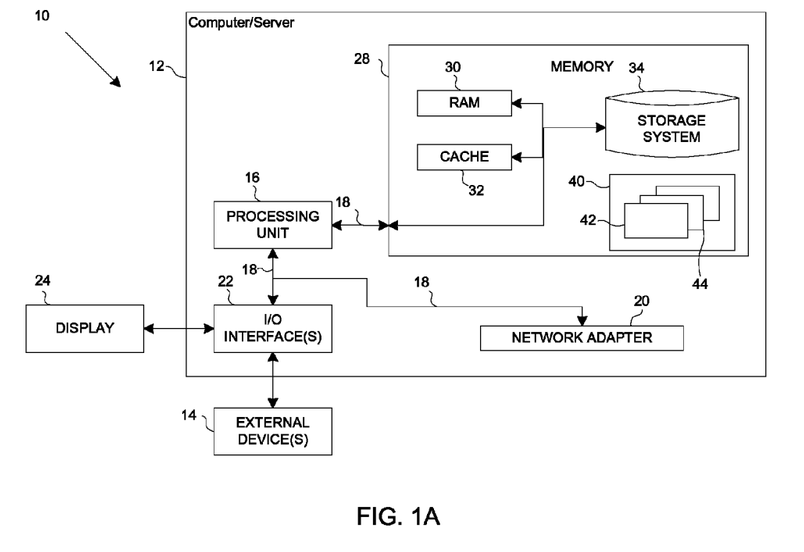
FIG. 1A is a schematic block diagram depicting a computer system according to an exemplary embodiment of the disclosed invention.

Referring to FIG. 1A, a schematic of an exemplary computing computer system 10 is shown. The computer system 10 is one example of a suitable device and is not intended to suggest any limitation as to the scope of use or functionality of embodiments of the invention described herein.

In the computer system 10, shown in FIG. 1A, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 12 may be described in the general context of computer system-executable instructions, such as program modules, being executed by the computer system 10. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, the computer/server 12 in the computer system 10 is shown in the form of a general-purpose computer. The components of the computer/server 12 may include, but are not limited to, one or more processors or processing units 16, a system memory 28, and a bus 18 that couples various system components including the system memory 28 to the processing unit 16. In exemplary embodiments, the computer/server 12 may be a mobile device or a server.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, such as obstacle detection module 44, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, the computer/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 1B:
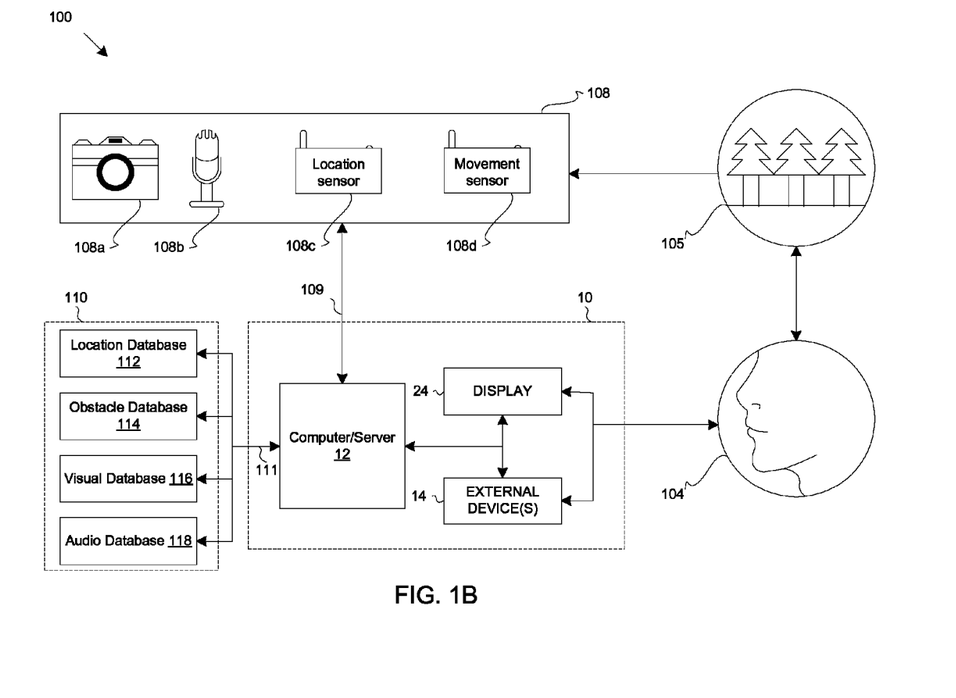
FIG. 1B is a schematic block diagram depicting a obstacle detection system using the computer system depicted in FIG. 1A, according to an exemplary embodiment of the disclosed invention.

Referring now to FIGS. 1A-B, according to an exemplary embodiment of the disclosed invention, an obstacle detection computer system 100 may include a computer system 10 as described in FIG. 1A, including a computer/server 12, a display 24 and other external devices 14 for communication with a user 104. The computer system 10 may execute a program module 42, such as an obstacle detection module 44, to implement a method according to an embodiment of the disclosed invention, described in detail below in connection with FIGS. 1A-2. In some embodiments program/utility 40 may be executed on devices, similar to the computer system 10, where separate program modules are run on separate devices, and communicate to each other through network adapter 20. The computer/server 12 may additionally communicate directly, or remotely, via communication link 109, with one or more environmental sensors 108, including, without limitation: a camera (photography and/or video) 108a, a microphone 108b, a location sensor 108c, and a movement sensor 108d. The environmental sensors 108 monitor and detect conditions present in the local environment 105. Other sensors and/or devices 14 may be used to detect, or affect, the interaction of the environment 105 with a user 104. The computer system 10 communicates via a database link 111 with a database 110 having one or more databases 110 such as, for example, a locations database 112, an obstacle database 114, a visual database 116, and an audio database 118, which are described more fully in connection with a method depicted in FIGS. 2. In some embodiments, the database 110 may be located in the memory 28 of the computer/server 12, and the database link 111 may be the bus 18. In additional embodiments, the databases may be located external to computer/server 12 such as, for example, a server or a cloud computing environment, and the computer server may obtain the information through the network adapter 20 and temporarily store the information in the RAM 30 before using the database 110 information.

Referring to FIG. 1B, the computer system 10 may communicate with the user 104 through one or more devices, which may include the display 24 or other external devices 14 (although it is not necessary for such devices to be external). In exemplary embodiments, the display 24 and the external devices 14 may be located on, or in close proximity to, a mobile device carried by the user 104. According to one example, the external device 14 may include an audio device (not shown), such as a speaker. These devices may allow the computer system 10 to warn the user 104 in order to avoid a possible obstacle or hazard in the environment.

With continued reference to FIG. 1B, the computer/server 12 may be a local device, such as a mobile device, or a remote device, such as a server, a computer or a component of a cloud computing environment. The local device and the remote device both contain the basic construction of computer/server 12, and may communicate with each other through network adapter 20. In some embodiments, the local device may receive information from environmental sensors 108 through I/O interface 22, where method 200 is performed by program modules 42 using processing unit 16. In embodiments where the computer/server 12 is a remote device, a local device may receive information from environmental sensors 108 through I/O interface 22 and transmit data via environmental data connection 109, and may be received by the computer/server 12 through network adapter 20. In additional embodiments, some program modules 42 may be run by the processing unit 16 on the local device while other program modules 42 are run on processing unit 16 of computer/server 12, and communicate via network adaptor 20. The determination of where program modules 42 may be run may be done to more efficiently allocate resources, such as power consumption and processing power, and take into account variables such as the network connection of the local device with the remote device. For example, a local device may receive audio from 108b and filter out background noise prior to transmitting data to the remote device via network adapter 20.

With continued reference to FIG. 1B, according to aspects of the disclosed invention, the environmental sensors 108 of the obstacle detection computer system 100 may detect various conditions in the local environment 105 in the vicinity of the user 104. In some embodiments, the environmental sensors 108 may be located on a mobile device carried by the user 104. In additional embodiments, the environmental sensors 108 may be separate, but in close proximity (e.g., within 3 meters), to a mobile device carried by the user 104, and communicate with the mobile device either through wired (e.g., an attachment plugged into the phone) or wireless (e.g., bluetooth) connections. In yet other embodiments, the environmental sensors 108 may be located at a fixed location, and communicate audio and visual information back to a server or cloud computing environment, which may then be combined with the location of the user 104. For example an environmental sensor 108 may be a camera 108a and may be pointed in the direction of movement of the user 104 to detect potentially hazardous objects or obstacles in the path the user 104. Alternatively, or additionally, the camera 108a may be pointed away from the direction of movement and may detect objects that may precisely define the location of the user 104. In other embodiments, the camera 108a may be focused at a set location, and determine whether various users 104 may come into contact with various obstacles at that location. In exemplary embodiments a microphone 108b may be used to detect audio of the surrounding environment. In exemplary embodiments, the location sensor 108c may be located on or near the mobile device to give precise location data. The location sensor 108c may be any number of known devices such as, for example, a global position system (GPS) receiver. Additionally, or alternatively, the location sensor 108c located on or near a mobile device of the user 104 may use cell tower triangulation and/or Wi-Fi signals emanating from known locations to determine or refine the location of the user 104 in the environment 105. In exemplary embodiments, the movement sensor 108d may be located on or near the mobile device to determine the velocity of the user 104. The movement sensor 108d may be any number of known devices, alone or in combination, such as, for example, a gyroscope, an accelerometer or a compass. Other environmental sensors 108 may also be used.

Obstacle detection module 44 is program code that instructs processing unit 16 to obtain data from environmental sensors 108, as well as information stored in database 110, to determine whether a user 104 is approaching an obstacle. In some embodiments, the obstacle detection module 44 may be operated on the processing unit 16 of a mobile device carried by a user 104. In additional embodiments, the obstacle detection module 44 may be operated on the processing unit 16 of a remote device (e.g. server, cloud computing infrastructure) and transmit an alert to a mobile device carried by a user 104. The obstacle detection module 44 is explained in further detail with reference to FIG. 2.

Figure 2:
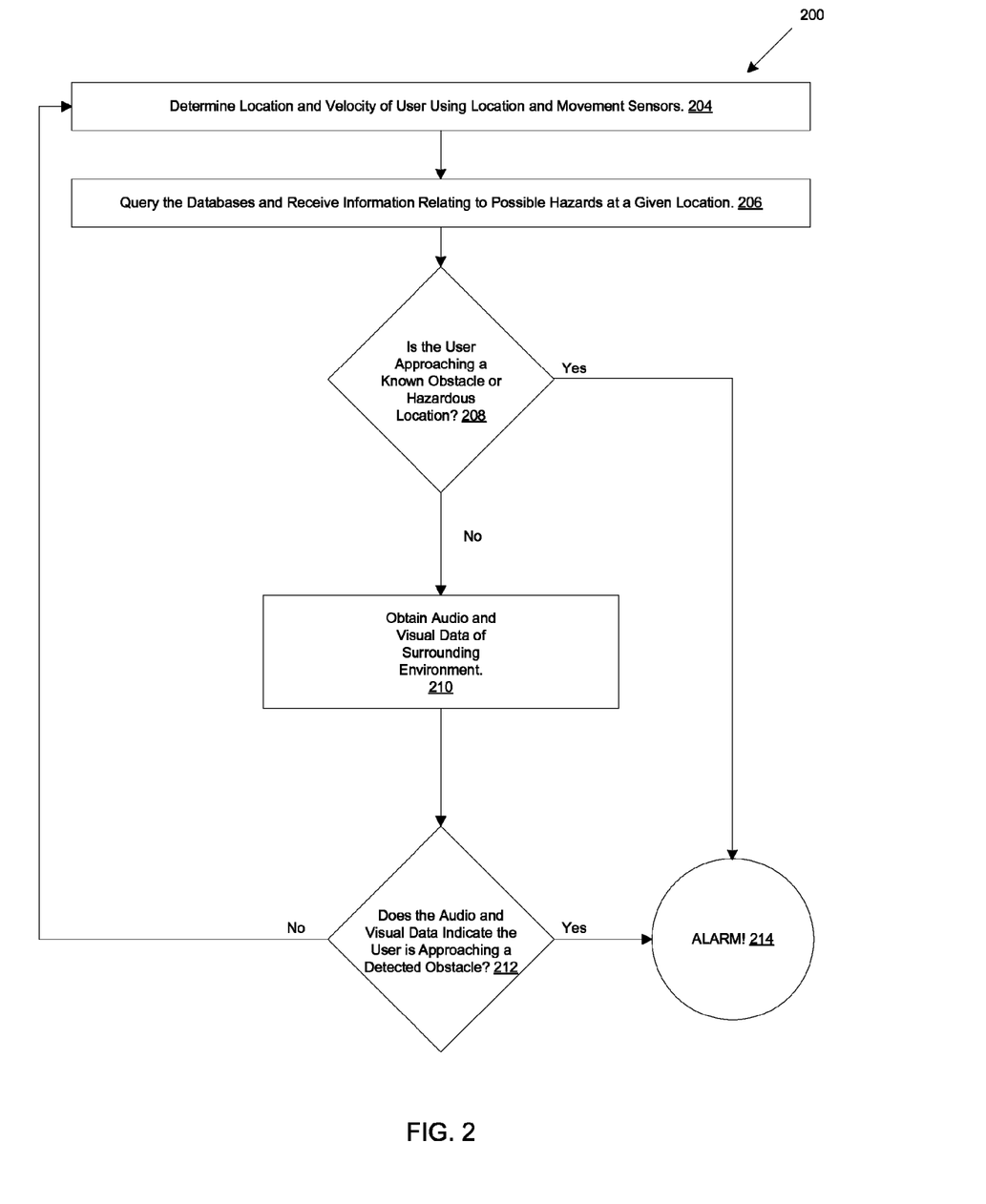
FIG. 2 is a flowchart depicting a method for detecting obstacles according to an exemplary embodiment of the disclosed invention.

Referring to FIG. 2, the flow chart describes a method 200 for an obstacle detection computer system 100, operated by obstacle detection module 44. FIG. 2 is described with the aid of the exemplary computer system 10 and an obstacle detection system 100 of FIG. 1A and FIG. 1B. According to an exemplary embodiment of the disclosed invention, the obstacle detection module 44 receives sensory input from the environment 105 and alerts the user 104 of possible environmental obstacles so the user 104 may avoid them. The obstacle detection module 44 may receive sensory input from the environment, and use information located on a database to analyze the sensory input and determine if the user 104 is approaching an obstacle. If the user 104 is approaching an obstacle, the obstacle detection module 44 may alarm the user 104 so they may avoid the obstacle.

At 204, the location and velocity may be determined using a combination of real time input from the location sensor 108c and the movement sensor 108d, as well as historical data from the location sensor 108c and the movement sensor 108d, which may act to refine the position and velocity. In exemplary embodiments, location may be determined using a combination of information obtained from the location sensor 108c such as, for example, GPS, Wi-Fi signals and cell tower triangulation. In such embodiments, location data may be combined based on the accuracy of the measurement to refine the location of the user 104. In additional embodiments, audio and/or visual data may refine the position or direction of the user 104. For example, subtle clues such as visual identification of landmarks may refine the location and velocity 204. In additional examples, computer system 10 may use background noise, or the intensity and color of light, to determine whether a user is indoors or outdoors.

At 204, in exemplary embodiments, the velocity (v) of a user 104 may be determined using acceleration (a) received from the movement sensor 108d (e.g., an accelerometer), and combined with recent velocity ($v_o$) stored in RAM 30 at a time (t) in the past, where $v=v_o+a*t$. In exemplary embodiments, direction of movement may be determined using the movement sensor 108d, either using a gyroscope to detect rotational changes (corresponding to changes in direction) or using a compass to detect the orientation of the user 104 with respect to the Earth's magnetic north pole. In additional embodiments, velocity may be determined by using a history of the location of the user 104, and using the change in location versus time to determine the velocity of the user 104.

At 206, the obstacle detection module 44 queries the database 110 to receive information relating to possible obstacles or hazards at the location, and predicted location, of the user 104. Likely obstacles are determined by the location of the user 104, and the current path of the user 104, and may be any obstacle that the user 104 may encounter at the current position of the user 104, or in the near future.

At 206, the obstacle detection module 44 uses the location and velocity 204 of the user 104 to query a location database 112 to obtain relevant information about the location of the user 104. The location database 112 may contain a map data, such as streets, buildings, rivers, mountains or any other relevant geographic information. The location database 112 may contain generic location information about each location on the map, such as whether the user 104 is in a building, in a rural or urban environment, or the type of road the user 104 is near (e.g., highway, busy urban thoroughfare, and alleyway). Such data may aid in determination of obstacles in the path of the user 104.

At 206, the obstacle detection module 44 may additionally query the visual database 116 and the audio database 118, using the generic location information obtained from the location database 112 to determine what possible audio or visual cues may signal a possible obstacle. For example, if the generic location of user 104 is on an urban sidewalk, the visual database 116 may return information for visual cues relating to, for example, a fire hydrant, while the audio database 118 may return audio cues relating to, for example, an automobile. In such examples, visual cues may be, for example, an image or a 3-D rendering of an object that may be compared to incoming visual information. In such examples, audio cues may be, for example, a signature audio fragment of known obstacles (e.g., a car engine).

At 206, using the location and velocity of the user 104, computer system 10 additionally queries an obstacle database 114 as to known obstacles located near, or in the path of, the user 104. The obstacle database 114 may contain coordinates that relate to a specific location of a map contained in the location database 112. The obstacle database 114 may contain locations and severity of a known obstacle such as, for example, a pothole, a construction zone, a set of stairs or other fixed objects, in order to alert the user 104 of the possible obstacle.

At 208, the obstacle detection module 44 determines whether the user 104 is approaching a known obstacle 208 using information obtained from the obstacle database 114. The obstacle detection module 44 determines that the user 104 is approaching an obstacle by determining the predicted path of the user 104 using the location and velocity of the user 104. If the current path of the user 104 indicates that it is likely they will interact (e.g., collide, fall into) with the obstacle, the obstacle detection module 44 sends an alarm 214 to the user 104.

At 210, the obstacle detection module 44 obtains audio and visual data of the surrounding environment. The visual data may be obtained from camera 108a, and may be in the form of still images or video. The visual data may be subjected to any number of processing techniques that may, for example, reduce the effects of vibration, determine movement, determine orientation of the camera or define relative proximity of the user 104 to an obstacle, which may aid in comparing the visual data with information from the visual database 116. The audio data may be obtained from microphone 108b. The audio data may be subjected to any number of processing techniques that may, for example, isolate individual sounds or eliminate background noise, which may aid in comparing the audio data with information from the audio database 118.

At 212, using audio and visual data obtained about the surrounding environment, obstacle detection module 44 determines whether the user 104 is approaching a detected obstacle. In an exemplary embodiment, if an obstacle is detected based on audio and/or visual input, obstacle detection module 44 sends an alarm 214 to the user 104.

At 212, in some embodiments the visual input may serve as the primary input to detect an obstacle. In such embodiments, visual input from camera 108a may be compared with known visual cues from the visual database 116 to determine if an obstacle exists. For example, if user is walking on a sidewalk, visual database 116 may return a visual cue such as a fire hydrant, which may be compared to incoming visual input from the camera 108a to determine whether a fire hydrant is in the path of the user 104.

At 212, in exemplary embodiments, an object may be detected by comparing adjacent segments of the visual input (e.g., pixels of an image) to determine if they correspond to the same, or different objects. In doing so, the obstacle determination system may look for large changes in characteristics such as, for example, color, roughness and intensity of light, between two adjacent segments.

At 212, in additional embodiments, the obstacle detection module 44 may detect an obstacle by comparing visual input obtained from camera 108a with the expected background for a given location, obtained from obstacle database 114, and inferring that any sufficient difference between the expected background and the observed background may be an obstacle. For example, if the user 104 is walking on a sidewalk, the obstacle detection module 44 may compare the visual images received from camera 108a with the expected visual images for a sidewalk, and determine the existence of an obstacle based on detecting an object that is dissimilar from objects the expected to be observed sidewalk.

At 212, in exemplary embodiments, after an object is detected, proximity and height may be determined based on the location of the object in the visual image obtained from camera 108a. Proximity may be determined by the location of the base of the object with respect to the direction of motion. For example, when the camera 108a is pointed directly ahead of the user 104, the lower the base of the object is in the image, the closer the object would be. Relative height of the object may be determined by vertical size, and the geometric shape, of the object in the image. For example, when the camera 108a is pointed directly ahead of the user 104 the larger the vertical height of the object in the image, the taller the object would be. In additional embodiments, the geometry of the object, as well as historical images, may be used to determine whether the object is vertical, or along the ground. For example, if the horizontal thickness of an image decreases along the vertical access of the image, it may signal an object along the ground. In other examples, historical images may be obtained using different sight lines as the current image, creating a pseudo-stereo view, which may allow the obstacle detection module 44 to determine the height and proximity of the object due to subtle geometric differences in the object as it relates to its background.

At 212, in exemplary embodiments, the obstacle detection module 44 determines whether the user 104 is approaching a detected obstacle. This may be accomplished by tracking the movement of the obstacle across the image, and determining if the obstacle is, or will be, in the path of the user 104. For example, if the camera 108a is held vertically, an obstacle that moves vertically, from top to bottom, and is in the center of the image may encounter the user 104.

At 212, to determine if the user 104 is approaching a detected obstacle, in some embodiments the audio input may serve as the primary obstacle detection method. In some embodiments, audio input from microphone 108b may be compared with known audio signatures from the audio database 118 to determine if an obstacle exists. In exemplary embodiments, audio signatures, such as frequency or volume, may indicate that an obstacle or possible hazard is present. For example, audio input from microphone 108b may be isolated and compared to the audio frequency and volume of a jackhammer received from audio database 118, which may indicate the presence of a construction zone. In exemplary embodiments, the Doppler shift of the audio input may indicate an obstacle or possible hazard. For example, the Doppler shift of the audio input received from microphone 108b may indicate an automobile is approaching the user 104.

At 212, to determine if the user 104 is approaching a detected obstacle, in an exemplary embodiment the obstacle detection module 44 may use location information, audio information and visual information in combination to determine the likelihood that an obstacle will come into contact with the user 104. When determining whether a possible obstacle exists, the obstacle detection module 44 may come up with a probability that the user 104 may encounter an obstacle. In some instances, individual stimuli from audio, visual or location data, may be interpreted as creating a hazardous situation for the user, or may signal that the user 104 may encounter an obstacle. However, in exemplary embodiments, for example, audio and location data may increase or decrease the determined probability that a user 104 may encounter an obstacle, and depending on the probability and the preferences of the user 104 may send an alarm 214 to the user 104. In one example, the obstacle detection module 44 may use the location of the user 104 to determine the user 104 is traveling approaching train tracks, and determine that a train is approaching the user 104 based on audio cues (e.g., volume of the engine, Doppler shift) and visual cues (e.g., a recognition of the train). In some examples, the obstacle detection module 44 may take visual data of a train, as well as location data that the user 104 is on the train tracks, which alone may signal a warning. However, in combination with audio data detecting a decrease in the frequency of the train (a Doppler shift indicating the train is moving away from the user), the obstacle detection module 44 may not signal an alarm. In other examples, the obstacle detection module 44 may receive visual data indicating the train is approaching the user 104, and may receive audio data indicating an increase in volume and frequency of the train, which in combination would indicate an approaching train. However, in combination with location data indicating the user is approximately 20 m from the train tracks, and thus not in the path of the train, the method may determine the likelihood of interaction is less likely, and may alarm the user. In yet another example, the obstacle detection module 44 may receive visual data indicating the train is approaching the user 104, as well as audio data indicating an increase in volume and frequency of the train, and location data indicating a user 104 is within 5 m of the train tracks. In such an example, the obstacle detection module 44 would alarm the user 104 of the hazardous situation.

At 214, the alarm 214 may be a visual alarm (e.g., an on screen warning), an audio alarm (e.g., an alert tone), a tactile alarm (e.g., phone vibration), or any combination of the three. As the user 104 approaches the obstacle, the intensity (e.g., increase sound of alarm, intensity of vibration or lock the screen of the device) of the alarm may increase in order to warn the user 104 of the obstacle. In exemplary embodiments, the user 104 may select a preferred method for alarm. The preferred method for alarm may correspond to different environmental conditions (e.g., phone in the pocket of the user 104, level of noise), or the type of obstacle present (e.g. different audio warning for a tripping hazard and a collision hazard). In additional embodiments, the user 104 may select the sensitivity of the alarm (e.g., low, medium, high) which may correspond with the likelihood of interaction with an obstacle, or the level of harm an obstacle may cause.

Figure 3:
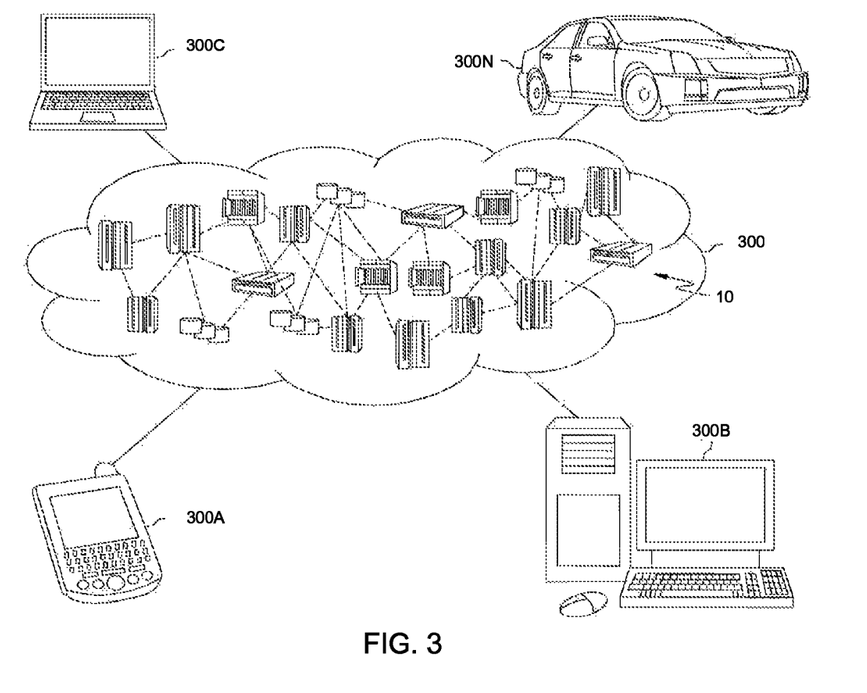
FIG. 3 is a schematic block diagram of an illustrative cloud computing environment, according to an embodiment of the disclosed invention.

Referring now to FIG. 3, an illustrative cloud computing environment 300 is depicted. As shown, the cloud computing environment 300 comprises one or more cloud computing nodes, each of which may be a computer system 10 with which local computing devices used by cloud consumers, such as, for example, a personal digital assistant (PDA) or a cellular telephone 300A, a desktop computer 300B, a laptop computer 300C, and/or an automobile computer system 300N, may communicate. The computer system 10 may communicate with one another. They may be grouped (not shown) physically or virtually, in one or more networks, such as Private, Community, Public, or Hybrid clouds as described hereinabove, or a combination thereof. This allows the cloud computing environment 300 to offer infrastructure, platforms and/or software as services for which a cloud consumer does not need to maintain resources on a local computing device. It is understood that the types of computing devices 300A-N shown in FIG. 3 are intended to be illustrative only and that the computer system 10 and the cloud computing environment 300 can communicate with any type of computerized device over any type of network and/or network addressable connection (e.g., using a web browser).

Referring to FIGS. 1A-3, method 200 may be performed using a cloud computing environment 300. In such embodiments, individual nodes may operate a single or multiple program modules 42, using a processing unit 16. In other such embodiments, individual nodes may contain information from the database 110 in the storage system 34 of memory 28.

Figure 4:
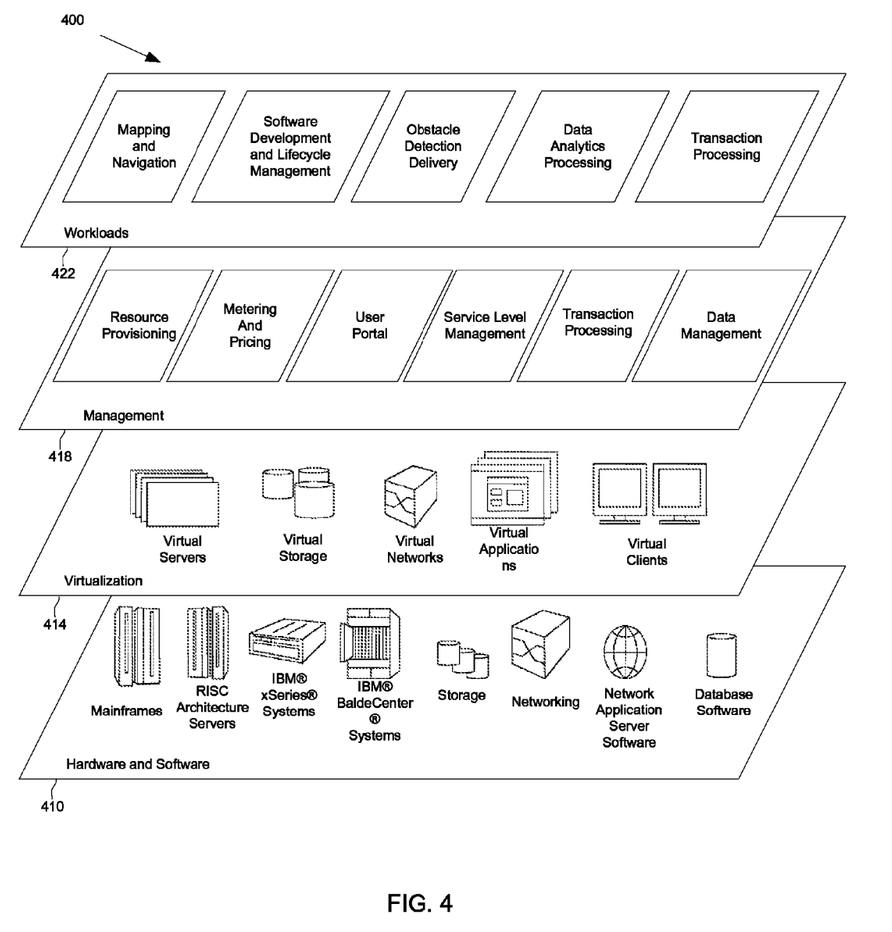
FIG. 4 is a multi-layered functional illustration of the cloud computing environment depicted in FIG. 3 according to an exemplary embodiment of the disclosed invention.

Referring now to FIG. 4, a set of functional abstraction layers 400 provided by the cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

The hardware and software layer 410 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 414 provides an abstraction layer from which the following examples of virtual entities may be provided: virtual servers; virtual storage; virtual networks, including virtual private networks; virtual applications and operating systems; and virtual clients.

In one example, the management layer 418 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 422 provides examples of functionality for which the cloud computing environment may be utilized. Examples of workloads and functions which may be provided from this layer include: mapping and navigation; software development and lifecycle management; obstacle detection delivery; data analytics processing; and transaction processing.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting obstacles using a computing device, comprising:
    identifying, by one or more processors, environmental information related to an external surrounding environment in relation to one or more computing devices, wherein the environmental information comprises of an audio data and a visual data;
    determining, by one or more processors, geographic information of the one or more computing devices;
    determining, by one or more processors, whether one or more obstacles are present based on the audio data, the visual data, and the geographic information, wherein determining whether one or more obstacles are present comprises:
  obtaining information pertaining to obstacles based on the geographic information, wherein the information pertaining to obstacles comprises an audio signature; and
  determining the obstacle is present based on the audio data matching the audio signature;
based on determining one or more obstacles are present, transmitting an alert.

2. The method of claim 1, wherein the alert comprises at least one of an audio warning, a visual warning and a tactile warning.

3. The method of claim 1, wherein the one or more computing devices includes one or more visual sensing devices and one or more auditory sensing devices.

4. The method of claim 1, further comprising:
  determining, by one or more processors, a type of obstacle for each of the one or more obstacles; and
  transmitting an alert based on the determined type of the one or more obstacles.

5. The method of claim 1, wherein the computing device is a mobile device.

6. The method of claim 1, wherein determining the geographic information comprises:
  identifying, by one or more processors, a location associated with the external surrounding environment; and
  identifying the geographic information corresponding to the identified location.

7. The method of claim 1, wherein the geographic information includes at least one or more audio cues or at least one or more visual cues related to a possible obstacle in the external surrounding environment.

8. A system for detecting obstacles using a mobile device, comprising:
  a computer having a processor, and a computer-readable storage device; and
  a program embodied on the storage device for execution by the processor, the program having a plurality of program modules, including:
    an identifying module configured to identify environmental information related to an external surrounding environment in relation to one or more computing devices, wherein the environmental information comprises of an audio data and a visual;
    a first determining module configured to determine geographic information of the one or more computing devices;
    a second determining module configured to determine whether one or more obstacles are present based on the audio data, the visual data, and the geographic information, wherein determining whether one or more obstacles are present comprises:
      a module to obtain information pertaining to obstacles based on the geographic information, wherein the information pertaining to obstacles comprises an audio signature; and
      a module to determine the obstacle is present based on the audio data matching the audio signature; and
    an alerting module configured to transmit an alert based on determining one or more obstacles are present.

9. The system of claim 8, wherein the alert comprises at least one of an audio warning, a visual warning and a tactile warning.

10. The system of claim 8, wherein the one or more computing devices includes one or more visual sensing devices and one or more auditory sensing devices.

11. The system of claim 8, further comprising:
  a third determining module configured to determine a type of obstacle for each of the one or more obstacles; and
  the alerting module configured to transmit an alert based on the determined type of the one or more obstacles.

12. The system of claim 8, wherein the computing device is a mobile device.

13. The system of claim 8, wherein determining the geographic information comprises:
  identifying, by one or more processors, a location associated with the external surrounding environment; and
  identifying the geographic information corresponding to the identified location.

14. The system of claim 8, wherein the geographic information includes at least one or more audio cues or at least one or more visual cues related to a possible obstacle in the external surrounding environment.

15. A computer program product for detecting obstacles using a mobile device, comprising a computer-readable storage medium having program code embodied therewith, the program code executable by a processor of a computer to perform a method comprising:
  identifying, by one or more processors, environmental information related to an external surrounding environment in relation to one or more computing devices, wherein the environmental information comprises of an audio data and a visual data;
  determining, by one or more processors, geographic information of the one or more computing devices;
  determining, by one or more processors, whether one or more obstacles are present based on the audio data, the visual data, and the geographic information, wherein determining whether one or more obstacles are present comprises:
    obtaining information pertaining to obstacles based on the geographic information, wherein the information pertaining to obstacles comprises an audio signature; and
    determining the obstacle is present based on the audio data matching the audio signature;
  based on determining one or more obstacles are present, transmitting an alert.

16. The computer program product of claim 15, wherein the alert comprises at least one of an audio warning, a visual warning and a tactile warning.

17. The computer program product of claim 15, wherein the one or more computing devices includes one or more visual sensing devices and one or more auditory sensing devices.

18. The computer program product of claim 15, further comprising:
  determining a type of obstacle for each of the one or more obstacles; and
  transmitting an alert based on the determined type of the one or more obstacles.

19. The computer program product of claim 15, wherein the computing device is a mobile device.

20. The computer program product of claim 15, wherein determining the geographic information comprises:
  identifying, by one or more processors, a location associated with the external surrounding environment; and identifying the geographic information corresponding to the identified location.

* * * * *